E. E. WICKERSHAM.
POWER DRIVEN STEERING MECHANISM FOR TRACTORS.
APPLICATION FILED SEPT. 18, 1918.
1,395,023.
Patented Oct. 25, 1921.
3 SHEETS—SHEET 1.
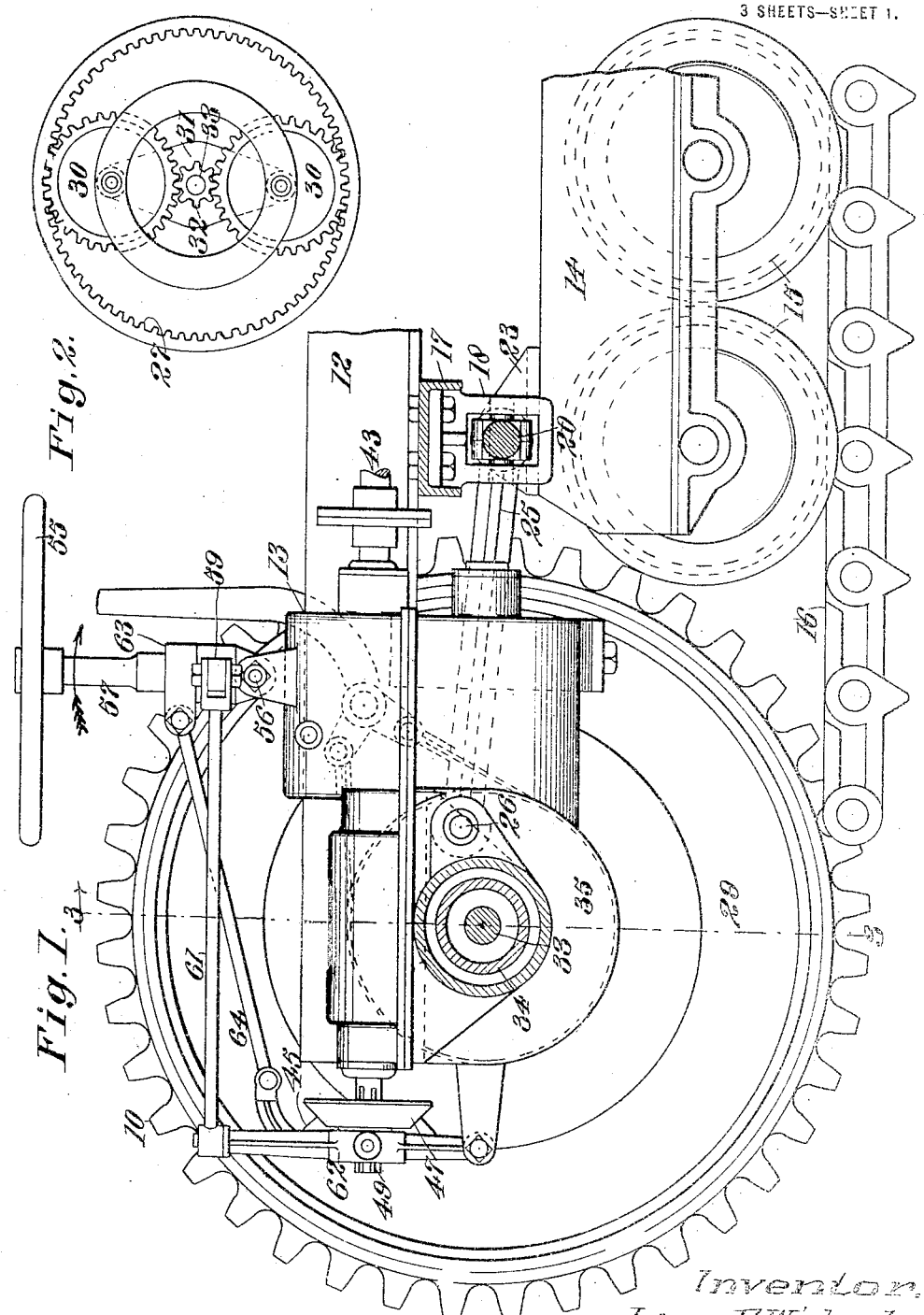

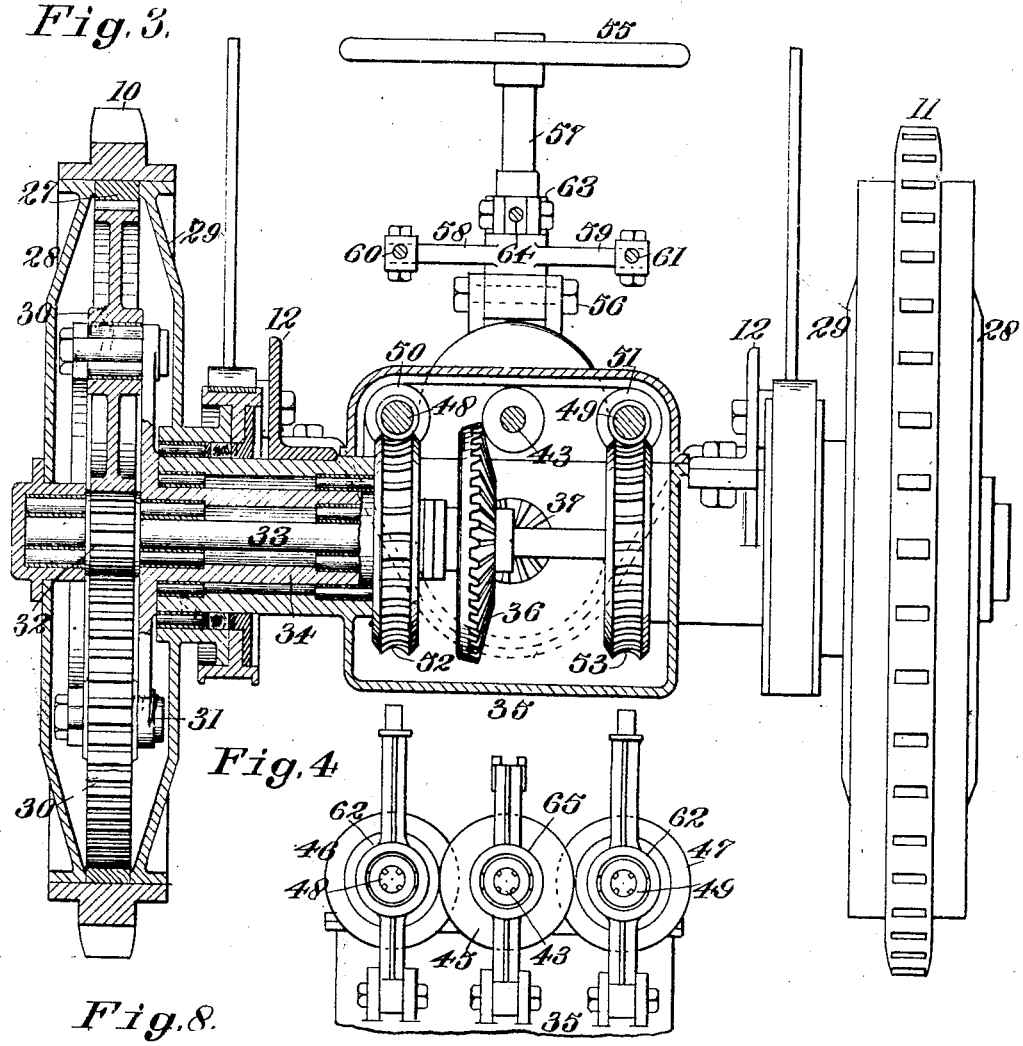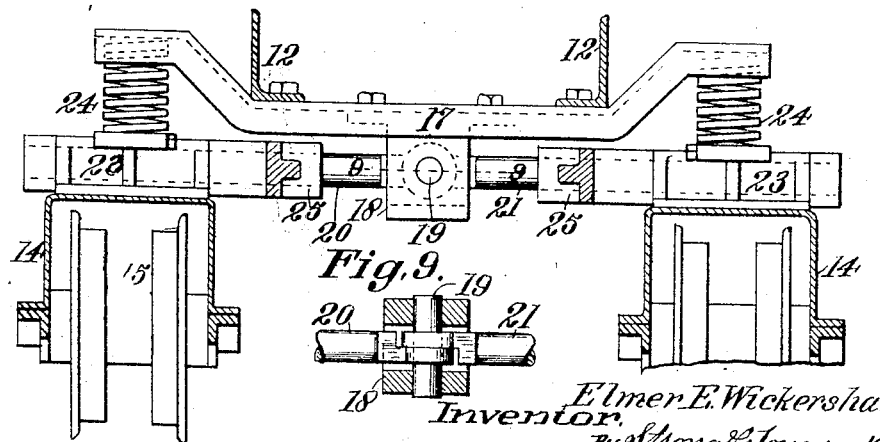

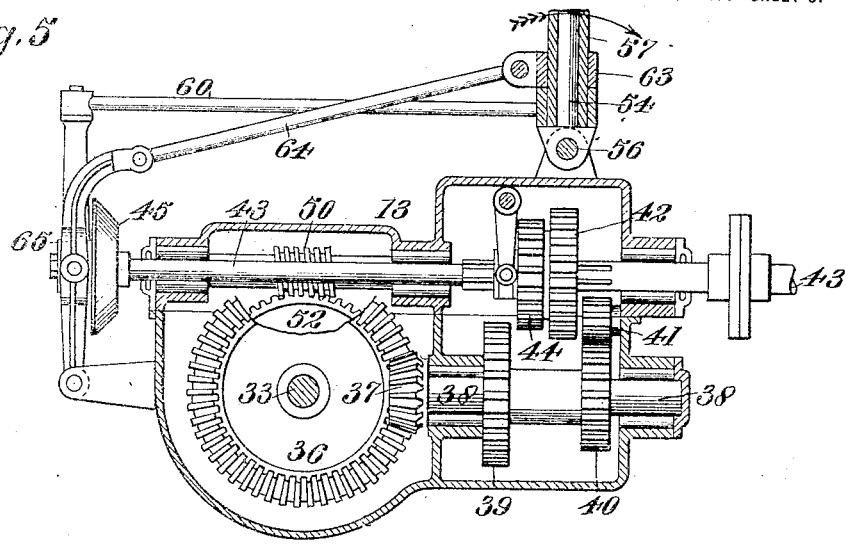
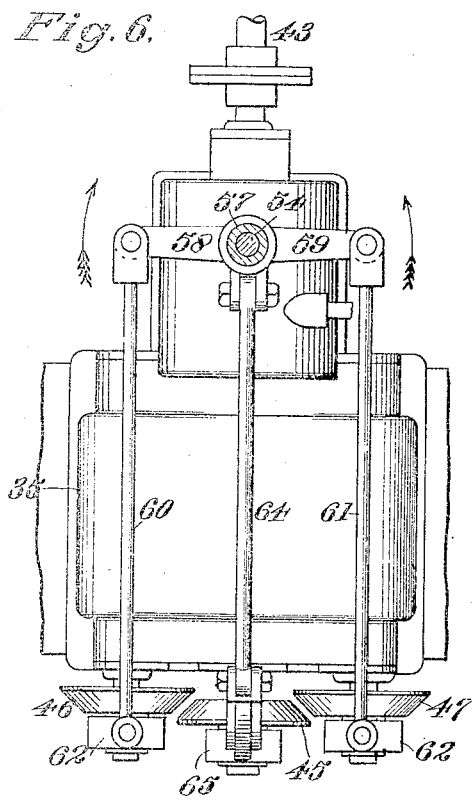
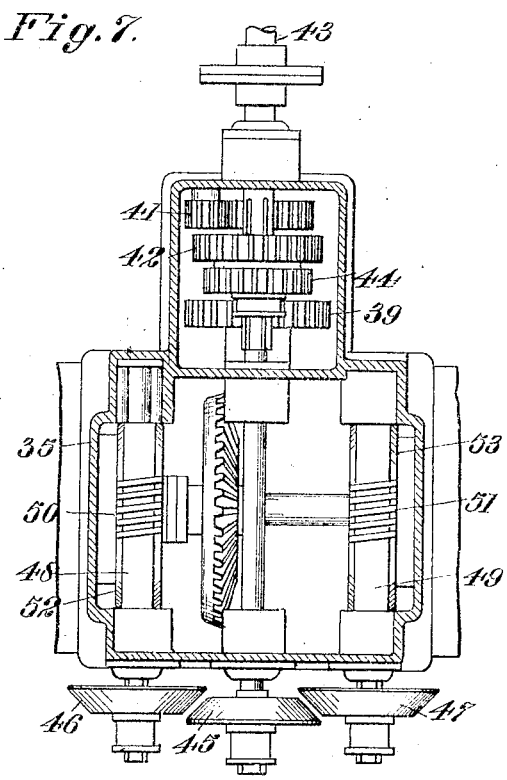

UNITED STATES PATENT OFFICE.

ELMER E. WICKERSHAM, OF STOCKTON, CALIFORNIA, ASSIGNOR TO THE HOLT MANUFACTURING COMPANY, OF STOCKTON, CALIFORNIA, A CORPORATION OF CALIFORNIA.

POWER-DRIVEN STEERING MECHANISM FOR TRACTORS.

1,395,023.

Specification of Letters Patent.

Patented Oct. 25, 1921.

Application filed September 18, 1918. Serial No. 254,600.

*To all whom it may concern:*

Be it known that I, ELMER E. WICKERSHAM, a citizen of the United States, residing at Stockton, in the county of San Joaquin and State of California, have invented a new and useful Improvement in Power-Driven Steering Mechanism for Tractors, of which the following is a specification.

This invention relates to a tractor transmission, and particularly pertains to a control therefor.

It is the principal object of this invention to provide a tractor transmission through which the separate traction elements of the running gear may be driven and which will control the speed of these elements so that they may be variably or constantly driven in forward or reverse directions as determined by the actuation of a single control element, said mechanism obviating a greater per cent. of the power loss now caused by the use of slipping clutches and brakes, due to the provision of a power driven mechanism for producing the desired variation in rotation of the transmission elements; and to further provide a desirable yieldable connection between the roller truck frames of the elements and the tractor main frame.

The present invention contemplates the use of final drive traction means, as disclosed in my co-pending application filed August 16th, 1915, and bearing Serial Number 45,638, in which planetary gear sets were embodied within the driving sprocket construction and were controlled by clutches which permitted them to slip in relation to each other. In the present instance, however, the clutches are eliminated and positively driven means is provided for producing a reduction in the speed of the separate sprocket wheels, either simultaneously or alternately, as controlled by a single operating lever. The invention further contemplates the use of an articulate bridle rod by which the track elements are connected with the main frame.

The invention is illustrated by way of example in the accompanying drawings, in which—

Figure 1 is an enlarged fragmentary view in side elevation illustrating the power transmission mechanism and its relation to the roller truck and main frames.

Fig. 2 is a view in elevation illustrating the planetary gearing incorporated within the final drive sprockets.

Fig. 3 is a view in vertical section, as seen on the line 3—3 of Fig. 1, more particularly disclosing the separate final drive structures of the transmission.

Fig. 4 is a view in end elevation illustrating the variable speed clutch elements.

Fig. 5 is a view in longitudinal section through the transmission mechanism disclosing the speed-changing gears and the power driven steering device.

Fig. 6 is a view in plan illustrating the transmission mechanism and the steering control.

Fig. 7 is a sectional view in plan illustrating the dual steering mechanism of the separate truck units.

Fig. 8 is a view in transverse section disclosing the bridle rods and the manner in which they couple the roller frames to the main frame.

Fig. 9 is a fragmentary view in section, as seen on the line 9—9 of Fig. 8, disclosing the hinge of the bridle rods.

In the drawings, 10 and 11 indicate the opposite driving sprockets for self-laying track chains. These sprockets are suitably mounted at the opposite sides of a main frame 12. This frame carries a power transmission mechanism 13 and a power plant, the latter not being shown in the drawings. The frame is supported at its opposite ends by roller truck frames 14 and load supporting rollers 15. The latter rest upon the lower run of endless chain tracks 16. The forward ends of the roller truck frames may be connected to the main frame in any desired manner to produce yieldable movement of the roller frames in relation to the main frame.

In the present instance, the rear ends of the roller frames are connected to the main frame by a mechanism shown in Figs. 1, 8 and 9. This mechanism comprises a transverse bolster 17, to the center and lower face of which is secured a hanger 18. This hanger carries a longitudinally extending hinge pin 19 which serves as a connection for oppositely projecting rods 20 and 21. These rods extend laterally in relation to the main frame and project through bearings 22 and 23 at their opposite ends. These bearings rotatably support the cylindrical portions of these rods and pivotally connect the truck frames 14 with the rods. It will be understood that the bearings allow the frames to swing vertically on the axes of the rods 20 and 21, at the same time allowing the frames to swing from the pin 19 carried by the hanger 18. This movement is resisted by helical springs 24 which are interposed between the outer ends of the bolster and the bearings 22, 23, thus affording a universal resilient support for the main frame upon the opposite independently movable roller frames. The rods 20 and 21 also carry a pair of rearwardly extending thrust rods 25. These thrust rods are free to rotate upon the bridle rods and are pivotally connected to opposite sides of the transmission case by pins 26, thus tying the roller frames in direct connection with the transverse axes of the driving sprockets 10 and 11.

The driving sprockets are provided with internal gears 27 which are inclosed by opposite sides of cover plates 28 and 29. The internal gear is in mesh with a pair of planetary pinions 30 which are carried by a spider 31 and rotate around the central axis of the sprocket. The adjacent sides of the pinions 30 engage the opposite sides of a driving gear 32. This gear is fixed upon a central driving axle 33, which extends entirely through the transmission case and similarly unites with the planetary gear set of the opposite sprocket.

The driving axle 33 serves as a support for the spider 31, as this spider has an inwardly extending tubular sleeve 34 through which the axle passes and around which it is free to rotate. Suitable anti-friction bearings are interposed between the axle and this sleeve to prevent binding. The spider sleeve is also rotatably supported within outwardly extending hubs formed upon the transmission case 35. These hubs are here shown as cast integral with the lower portion of the case and are surrounded at their outer ends by tubular flanges formed upon the inner cover plates 29. The hubs are also rigidly secured to the main frame 12. The driving axle 33 is fitted with a bevel gear 36 which is in mesh with a driving pinion 37 carried upon the rear end of a transmission countershaft 38. This shaft forms a part of a speed-changing transmission and is here shown as fitted with large and small gears 39 and 40. A small gear is in mesh with a reversing pinion 41, which, in turn, may mesh with a sliding gear 42 carried upon the engine shaft 43. A speed changing gear 44 is also carried upon this shaft and may be brought to mesh with the gear 39.

It is to be understood that this mechanism may be changed to incorporate several speed ratios and that the present invention is not particularly concerned with this construction other than the manner in which it indirectly affects the turning arc of the vehicle.

The engine shaft 43 extends rearwardly through the transmission and is fitted at its rear end with a splined friction cone 45. This cone is positioned with its faces converging toward the transmission case and is adapted to be brought to register with a pair of diametrically opposite cones 46 and 47, here shown as of like diameter. The cones 46 and 47 are splined to the parallel gear shafts 48 and 49. These shafts extend through the transmission case and are in horizontal and parallel alinement with the engine shaft. The shafts are provided with worm gears 50 and 51, which are in constant mesh with worm wheels 52 and 53 secured upon the inner ends of the opposite gear spider sleeves 34.

It will be observed that rotation of either of the shafts 48 and 49 will impart rotation to the planetary gear spiders and cause the gears carried thereby to move in relation to the driving sprockets, thus varying their normal speed.

It is desired that the worm gears shall be simultaneously or separately rotated to produce variable rotation of the two sprockets 10 and 11 or simultaneous rotation either in a forward or reverse direction. This is effected by a steering column 54, which carries a steering wheel 55 at its upper end and is hinged to the top of the gear case by a bolt 56 at its lower end. The hand wheel is fixed to a steering sleeve 57 carried by the column and free to rotate therearound. This sleeve has diametrically extending arms 58 and 59 which extend laterally of the vehicle and are pivotally connected at their outer ends to operating shafts 60 and 61. These shafts extend rearwardly and engage shifting yokes 62 pivotally carried by brackets upon the transmission case. This construction is particularly shown in Fig. 5. The sleeve 57 also carries a freely rotating collar 63 which is pivotally connected to a rod 64 leading to a central shifting yoke 65. This yoke controls the movement of the driving cone 45, while the yokes 62 separately control the movement of the cones 46 and 47. All three of these yokes are pivoted along a common horizontal axis. Their lengths are different, however, as the central yoke is shorter to produce advance action of the central cone in comparison with the movement of the outer clutches.

In operation of the steering mechanism the engine shaft 43 is driven by a suitable power plant and thereafter imparts motion to the countershaft 38 through the gears 42 and 44. Rotation of the countershaft and this pinion 37 will produce a continuous rotation of the driving axle 33. This axle will therefore simultaneously rotate the driving pinions 32 at its opposite ends, and under normal conditions will cause the axes of the two planetary gears 30 to stand stationary and the gears to rotate in unison to drive the circumscribing gear 27. This will insure equal speeds of rotation for the two driving sprockets 10 and 11.

In the event that the vehicle is to be guided from its straight course of travel it is only necessary to turn the steering wheel 55 in the direction desired. Assuming that the turn is to be made to the left, the steering wheel will swing the lever 58 rearwardly and will bring the cone 46 into frictional engagement with the constantly rotating cone 45. This rotation will positively drive the shaft 48 and thereafter act through the worm gears 50 and 52 to rotate the spider 31 of driving sprocket 10. This rotation will be directly opposite to the rotation of the driving sprocket and the axle 33 and will thus cause a disagreement in the rotating speeds of the axle and sprocket. This will decrease the speed of the sprocket 10, while permitting the sprocket 11 to continue at its normal speed, thus swinging the vehicle to the left upon an arc determined by the relative speed of the shaft 48 and the axle 33, the arc being longer when the change speed transmission gears are in high than when the latter are in low. The vehicle may be turned to the opposite direction by a reverse rotation of the hand wheel 55.

In case it is desired to simultaneously reduce the speeds of the two sprockets 10 and 11 the hand wheel may be swung directly forward to bring the cone 45 into engagement with both cones 46 and 47. The amount of slippage existing between this central cone and the opposite cones will affect the gear reduction and may be varied to change the speeds of the shafts 48 and 49 and thus control the forward rate of travel of the vehicle. In case the vehicle is to be reversed, excessive pressure is applied to the cone 45 in an effort to eliminate all slippage. This will accelerate the speeds of the shafts 48 and 49 in which the speed of rotation of the gear spiders 31 will be greater than the normal rotation of the sprockets and will thus overcome the forward driving action of the axle and cause the sprockets to reverse their rotation and carry the vehicle rearwardly.

In operation of the tractor inequalities in the roadway will cause the separate roller frames to move vertically out of alinement. This is accommodated in the present instance by the bridle rods 20 and 21 which are centrally pivoted beneath the frame and will allow the roller frames to swing radially in relation to the longitudinal axis of the main frame, as well as longitudinally in relation to the transverse axes of the bridle rods, thus producing a decidedly flexible frame suspension.

It will thus be seen that the transmission mechanism here disclosed provides simple controlling means by which the separate traction units of a vehicle may be accurately controlled to produce simultaneous or variable rotation by positive power driven means which will utilize a minimum of power in the steering operation, and that furthermore the vehicle frame will be yieldably supported in a desirable manner.

Having thus described my invention, what I claim and desire to secure by Letters Patent is—

1. A transmission mechanism for tractors comprising a driving shaft, a pair of driven members operatively connected thereto, a planetary gear set between the driving shaft and each driven member, power actuated means for separately controlling said gear sets to vary their effective speeds and to reverse their direction of travel, and a single control element to effect the operation of said power actuated means.

2. In a power transmission mechanism, a main shaft, a transversely extending drive shaft geared thereto, tractor driving means upon the opposite ends of the drive shaft, parallel steering shafts, gearing connecting the steering shafts with the driving means, and means for selectively connecting the steering shafts with the main shaft to cause rotation therewith.

3. In a tractor transmission, a main shaft, a driving axle geared thereto, planetary gear sets driven at the opposite ends of the driving axle and independently rotatable therearound, steering shafts disposed at the opposite sides of the main shaft, gearing means connecting the separate steering shafts with the separate planetary gear mechanisms, and selectively operated means for causing alternate or simultaneous rotation of the separate steering shafts.

4. In a tractor transmission, a main shaft, a driving axle geared thereto, planetary gear sets driven at the opposite ends of the driving axle and independently rotatable therearound, steering shafts disposed at the opposite sides of the main shaft, gearing means connecting the separate steering shafts with the separate planetary gear mechanisms, selectively operated means for causing alternate or simultaneous rotation of the separate steering shafts, and means whereby the said control may be effected by a single control member.

5. In a transmission mechanism for tractors, a drive shaft, a pair of driven members, a planetary gear set between the drive shaft and each driven member, a normally inactive power operated means for controlling each of said gear sets, and selectively operated means for imparting motion to either of the power operated means alternately or simultaneously, whereby to vary the effective driving speed of the planetary gear sets or to produce a differential rotation thereof.

6. In a power transmission for tractors, an engine shaft, speed-changing gears driven thereby, a driving axle connected by said gears to the engine shaft, driving pinions fixed upon the opposite ends of said axle, separate gear spiders rotatably mounted around the axle adjacent to the pinions, planetary gears carried by said spiders and adapted to mesh with the pinions upon the axle, driving sprockets driven by said gears, steering gears fixed to the hubs of said spiders, separate steering shafts adapted to operate said gears, reciprocating friction cones upon each of said shafts, a reciprocating friction cone upon the end of the engine shaft, and a control member for actuating said cones to alternately or simultaneously rotate the steering shafts in forward or reverse directions.

In testimony whereof I have hereunto set my hand in the presence of two subscribing witnesses:

ELMER E. WICKERSHAM.

Witnesses:
JOHN H. HERRING,
W. W. HEALEY.